(12) United States Patent
Smith

(10) Patent No.: US 7,299,252 B2
(45) Date of Patent: Nov. 20, 2007

(54) POWER SAVING ZERO PRUNING ALGORITHM FOR FAST FOURIER TRANSFORM (FFT) CIRCUITRY

(75) Inventor: Ronald P. Smith, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 725 days.

(21) Appl. No.: 10/682,622

(22) Filed: Oct. 9, 2003

(65) Prior Publication Data

US 2005/0080833 A1 Apr. 14, 2005

(51) Int. Cl.
*G06F 15/00* (2006.01)
(52) U.S. Cl. ..................................... 708/404
(58) Field of Classification Search ................ 708/403, 708/404, 405, 406, 408, 409
See application file for complete search history.

(56) References Cited

U.S. PATENT DOCUMENTS

| 5,808,925 | A | * | 9/1998 | Ito et al. ..................... 708/406 |
| 6,747,946 | B1 | * | 6/2004 | Kaneko et al. ............. 370/206 |
| 2003/0145026 | A1 | * | 7/2003 | Jin ............................. 708/404 |

* cited by examiner

*Primary Examiner*—Chuong D. Ngo
(74) *Attorney, Agent, or Firm*—Posz Law Group, PLC

(57) ABSTRACT

A fast Fourier transform (FFT) circuit from which unneeded butterfly computation modules can be effectively pruned for specific applications. Each module that is not needed is pruned by injecting zero signals into it, thereby minimizing the power dissipated in the pruned circuit. A multiplexer integrated into each butterfly module output (or input) line allows the line signal to be either forced to zero or allowed to carry a nonzero signal.

6 Claims, 3 Drawing Sheets

POWER SAVING ZERO PRUNING ALGORITHM FOR FAST FOURIER TRANSFORM (FFT) CIRCUITRY

BACKGROUND OF THE INVENTION

The present invention relates generally to fast Fourier transform (FFT) circuitry and, more particularly, to techniques for "pruning" FFT circuits to reduce both circuit complexity and power dissipation.

By way of brief background, the Fourier transform is a mathematical formula for converting a signal that varies with respect to time (a signal in the time domain), into a corresponding plot of spectral content of the same signal (a representation of the signal in the frequency domain). The discrete Fourier transform may be viewed as a special case of the continuous form of the Fourier transform. The DFT determines a set of spectrum amplitudes or coefficients from a time-varying signal defined by a periodic sequence of samples taken at discrete time intervals.

FFT technology has been known since the 1960s, when it was first recognized that the discrete Fourier transform (DFT) could be performed more rapidly using various mathematical techniques now known as the fast Fourier transform. The FFT is widely known and discussed in the technical literature and is used in a variety of signal processing applications in which there is a need to transform signals from the time domain to the frequency domain.

With the ongoing development of integrated circuit design and fabrication techniques, FFT circuits have been implemented as integrated circuits, more particularly those that are termed application-specific integrated circuits (ASICs). Regardless of the implementation techniques employed, there is often a design requirement to minimize circuit complexity and power dissipation in FFT circuits. A known approach for achieving this goal is to eliminate or "prune" circuit branches that do not contribute significantly to the required output of an FFT. More specifically, a particular FFT application may require fewer outputs from the circuit than the number resulting from the available inputs. For example, an eight-point FFT in general provides eight outputs, indicative of spectral content in eight spectral bands. The application may well need only four of the outputs, in which case the other four would be discarded. In accordance with the pruning technique, the FFT circuit is pruned during its design, to eliminate the unwanted branches and to produce only four outputs. In conventional FFT signal flow diagrams, it is typically the outer branches that are eliminated and the inner ones that are retained. However, there may be some applications of the FFT that call for elimination of branches all grouped on one side of the outputs. By eliminating branches, the circuit designer reduces circuit complexity, as measured, for example, by the number of logic gates in the circuit, and also reduces the total power dissipated by the circuit.

A significant drawback to this pruning technique is that it must be applied at the circuit design stage. Once a pruned FFT circuit has been fabricated, it can no longer be restored to its original state, i.e., before pruning. In other words, FFT circuits must be customized during design for specific applications. Reducing circuit complexity has become a lesser concern as the component density of integrated circuits has increased with improvements in fabrication techniques, but there is still a need to minimize power dissipation in many FFT applications. Therefore, it would be highly desirable to provide an FFT circuit that could be pruned for a specific application after its design and fabrication. The present invention is directed to this end.

SUMMARY OF THE INVENTION

The present invention resides in a fast Fourier transform (FFT) circuit in which circuit modules may be selectively pruned for use in specific applications. The invention achieves a significant reduction in power dissipation. The circuit comprises a plurality of computational stages connected in sequence, each computational stage comprising in turn a plurality of butterfly modules connected between multiple input lines and multiple output lines. The computational stages and the butterfly modules are connected to perform an FFT operation on a plurality of input signals applied to a first of the computational stages. Each of the butterfly modules comprises means for forcing each of its outputs selectively to zero. A zero output from a butterfly module affects at least one module downstream of the zero output and minimizes power dissipation in the downstream module or modules. The means for forcing to zero may alternatively be integrated into the inputs of each butterfly module In terms of a novel method, the present invention resides in a method for effectively pruning a fast Fourier transform (FFT) circuit having a plurality of computational stages, each of which includes a plurality of butterfly modules. The method comprises determining which butterfly modules need to be pruned for a particular application of the FFT circuit, and forcing the input signals of the butterfly modules located in the determining step to zero. The selected butterfly modules are effectively pruned from the circuit, in terms of power dissipation, because of their zero inputs.

It will be appreciated from the foregoing summary that the present invention represents a significant advance in FFT circuit design. In particular, unwanted circuit modules can be effectively pruned from the circuit to minimize power dissipation. Other aspects and advantages of the invention will become apparent from the following more detailed description, taken in conjunction with the accompanying drawings.

DETAILED DESCRIPTION OF THE DRAWINGS

Figure 1:
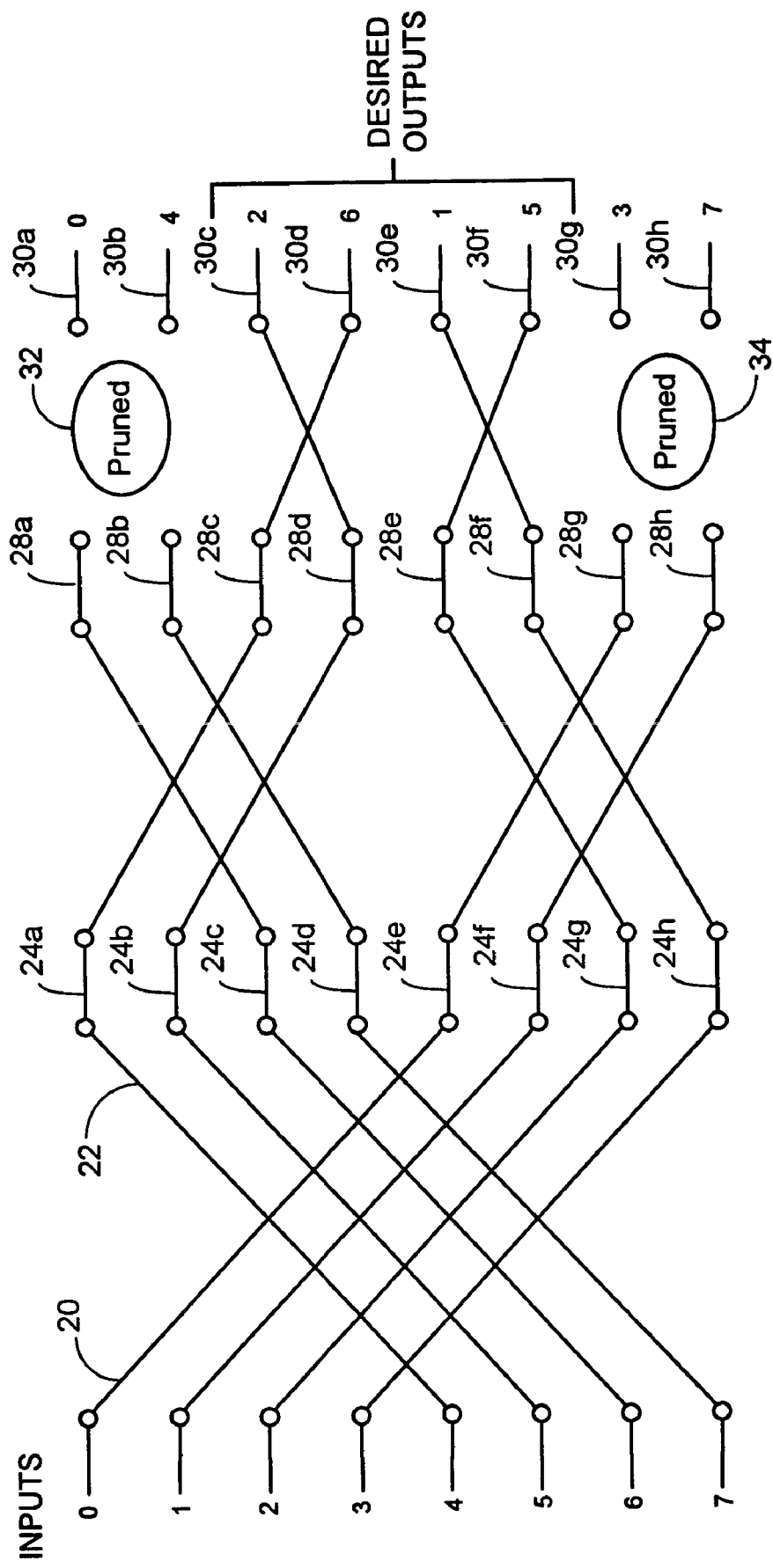
FIG. 1 is signal flow diagram of a radix-2 8-point FFT circuit that has been pruned in accordance with a prior art technique.

As shown in the drawings for purposes of illustration, the present invention is concerned with fast Fourier transform (FFT) circuits, and in particular with a technique for pruning unwanted branches from an FFT circuit, to customize it for a particular application. FIG. 1 is a conventional signal flow diagram for a radix-2, 8-point FFT circuit pruned in accordance with a prior art technique. The FFT function is commonly illustrated as a sequence of FFT butterfly computations.

Figure 3:
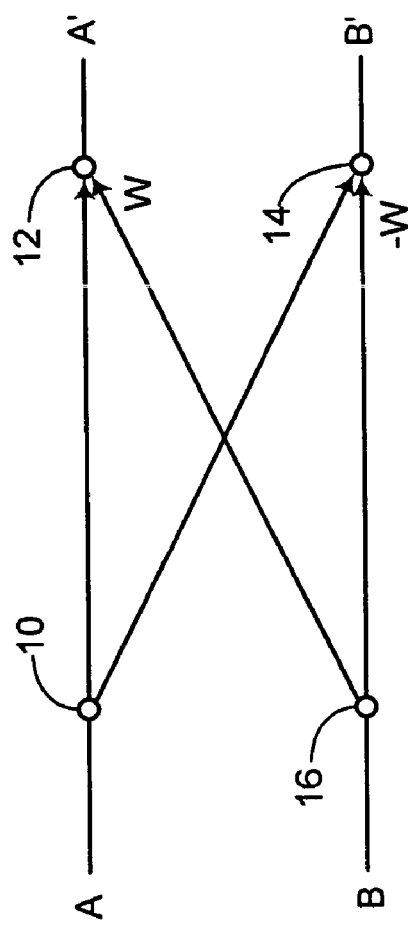
FIG. 3 is a schematic diagram of a conventional FFT butterfly.

The butterfly module is basic circuit building block for FFT designs and is shown by way of example in FIG. 3. The butterfly module operates on two input signals, indicated at A and B, respectively, and produces two output signals, A' and B', by combining the input values using a number of complex addition and multiplication operations. More specifically, the input signal A is split as indicated by the small circle 10, and transmitted to each of the small circles 12 and 14, which represent complex arithmetical functions. Similarly, the other input signal B is split as indicated by the small circle 16, and also transmitted to the arithmetical functions represented by 12 and 14. The arrows on the input signals to the circles 12 and 14 indicate that the function performed is a complex addition of the two input quantities. The presence of a number or quantity next to an arrow indicates that the corresponding signal is subject to complex multiplication by the number or quantity. Thus the output A' is given by A+WB, and the output B' is given by A−WB. The butterfly computations in FFTs may have other variations of this basic form. The precise form of the butterfly is not particularly relevant to the present invention. Regardless of the specific form, each butterfly generates two complex output signals, each of which is a complex arithmetic function of the two input signals. It will be understood that the term "complex" in this context refers to the nature of the signals as complex numbers rather than real numbers.

Figure 2:
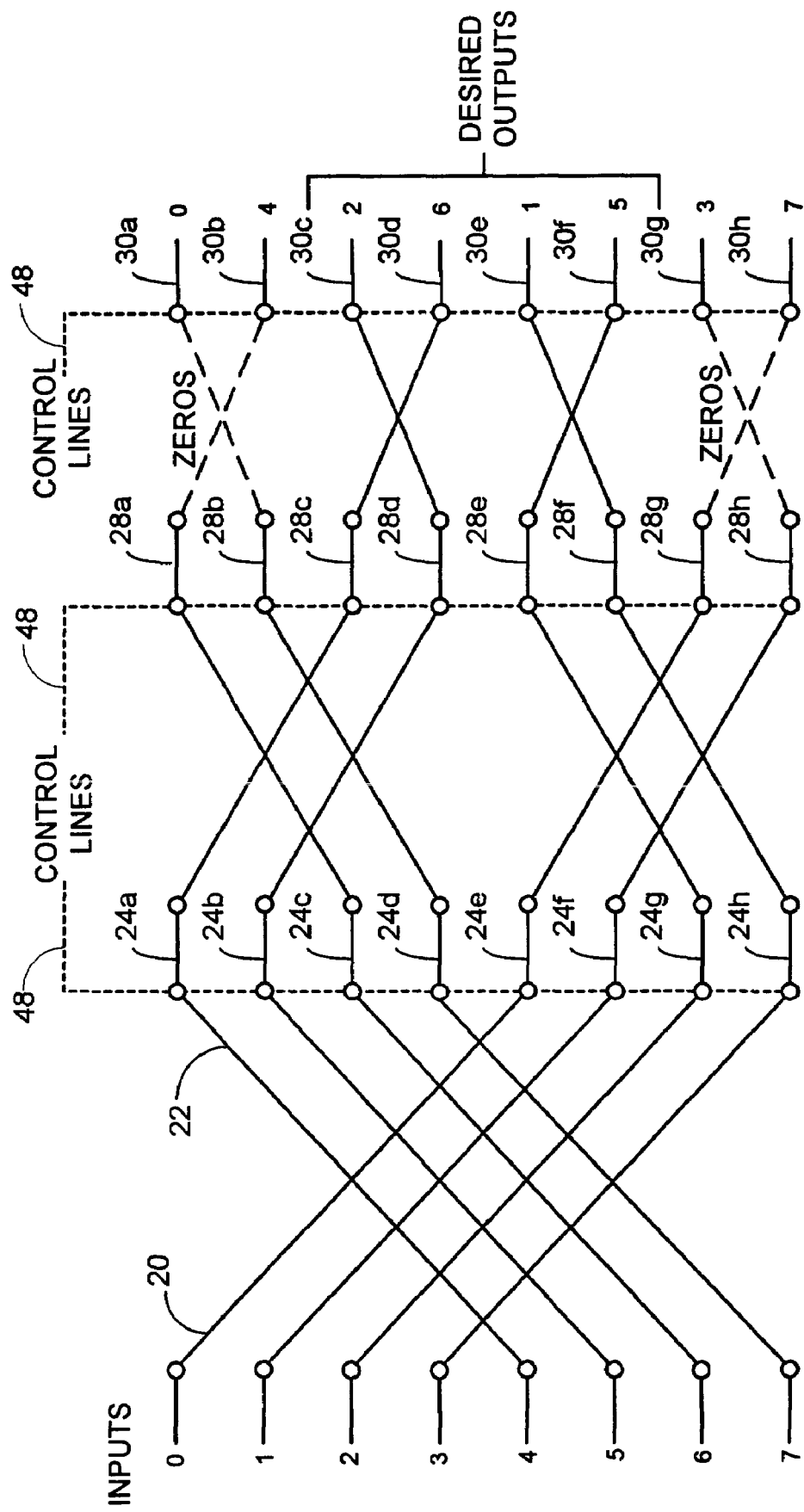
FIG. 2 is a signal flow diagram of a radix-2 8-point FFT circuit, showing the pruning technique in accordance with the present invention.

For simplicity in illustrating butterfly modules, they are frequently shown more simply as an "X" cross-connection linking the two inputs to the two outputs, and they are shown this way in FIGS. 1 and 2. In the conventional FFT of FIG. 1, there are three successive computational stages. In the first stage, eight inputs, designated by 0 through 7, provide the input pairs for four butterfly modules, each shown by an "X" cross-connection, such as the one indicated by lines 20 and 22, for example. The four first-stage butterfly modules receive input pairs (0 and 4), (1 and 5), (2 and 6), and (3 and 7), respectively. The first-stage butterfly modules generate eight outputs on lines 24a through 24h, and these provide the inputs to a second stage of butterfly modules. As shown, there are four second-stage butterfly modules with input pairs from (24a and 24c), (24b and 24d), (24e and 24g), and (24f and 24h), respectively, providing outputs on lines 28a through 28h.

In the third stage of computation, the signals on lines 28a through 28h are input to a third set of butterfly modules, with the inputs paired as (28a and 28b), (28c and 28d), (28e and 28f), and (28g and 28h), respectively, providing outputs on lines 30a through 30h. In the illustrative FFT circuit of FIG. 1, two of the four butterfly modules in the third stage of computation are "pruned" from the circuit, as indicated by the ovals 32 and 34. That is to say, they are removed, or more precisely, never fabricated. The desired outputs from the FFT are the outputs from the remaining butterfly modules of the third computational stage, i.e., the four outputs on lines 30c through 30f. As mentioned earlier, this is exemplary of the conventional pruning technique known in the art, in which butterfly modules ar pruned from the FFT circuit during design and manufacture, to provide a set of desired FFT outputs that is adequate for a particular application of the circuit. The drawback of such a technique is that the resulting FFT circuit cannot easily be modified to provide a full set of outputs or, more generally, to provide any different set of outputs.

FIG. 2 is shows diagrammatically how the level of pruning achieved in the FIG. 1 configuration is achieved in accordance with the present invention. Instead of physically pruning butterfly modules from the circuit, a similar effect is obtained by selectively injecting a zero signal into the butterfly modules that are to be logically pruned. This is indicated in FIG. 2 by the use of broken lines to depict the uppermost and lowermost butterfly modules in the third computational stage of the circuit. Injecting zero data into a butterfly module results in minimal power dissipation in the module, and in circuits downstream of the primarily affected module.

Figure 4:
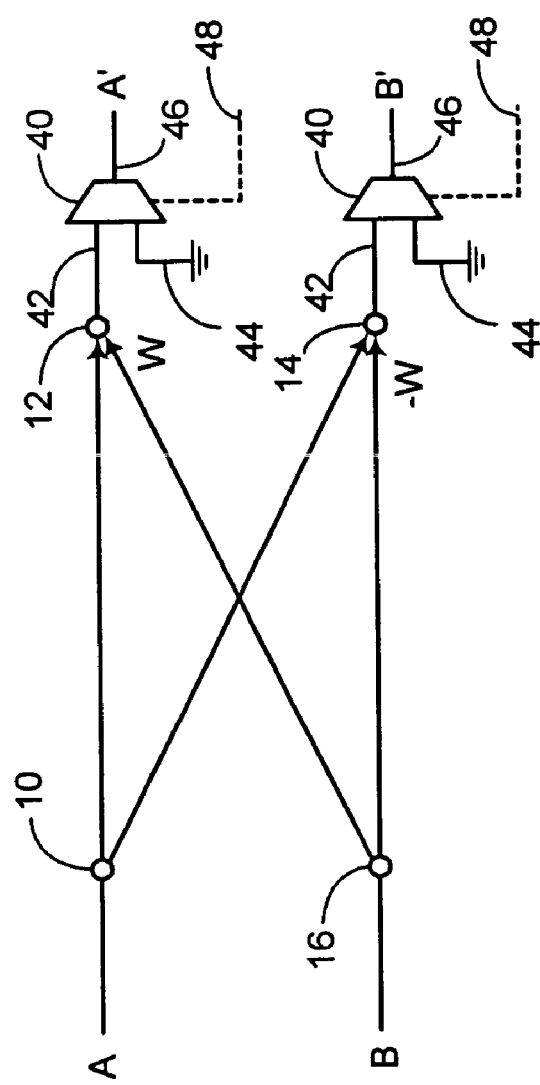
FIG. 4 is a schematic diagram of an FFT butterfly modified in accordance with the present invention.

One simple way to achieve selectively injecting zeros is shown in FIG. 4. In this modified form of a conventional butterfly module, each output line includes a multiplexer 40 having two inputs. One input, indicated at 42, is provided by the original output of the butterfly computation, and the other input is grounded, as indicated at 44. The output 46 of the multiplexer 40 is coupled to the next stage of computation in the FFT circuit. Each multiplexer 40 is controlled by a binary prune control signal on line 48. When the prune control signal is zero, the zero or grounded input 44 is selected and the output of the butterfly module is forced to zero. When the prune control signal on line 48 is non-zero, the normal butterfly output signal on line 42 is selected for output and the butterfly module functions conventionally.

It will be readily appreciated that, if all the butterfly modules in an FFT circuit include output multiplexers 40 that allow the butterfly outputs to be selectively forced to zero, then modules downstream of any zero-output butterfly module will be correspondingly affected. For example, in the FIG. 2 configuration, if the second-stage butterfly module outputs on lines 28a and 28b are forced to zero, then the inputs to the uppermost butterfly module in the third computational stage will be effectively pruned, as desired. Similarly, if the second-stage module outputs on lines 28g and 28h are forced to zero, then the inputs to the lowermost butterfly module in the third computational stage will also be effectively pruned.

The example of FIG. 2, in which uppermost and lowermost butterfly modules in the last computational stage are pruned, is not intended to be limiting. There may be applications in which it is desired prune other sets of modules from the circuit, or in which pruning is achieved by injecting zeros an earlier stage than the second stage as shown. It may also be desired to force one or more final outputs, from the third computational stage, to zero. Doing so would effectively disable downstream circuitry and minimize power dissipation in such circuitry. The invention might also be implemented with multiplexers integrated into the input lines, rather than the output lines, of each butterfly module. The control signals on lines 48 are shown in FIG. 2 as being connected to the outputs of each of the butterfly modules.

Accordingly, it will be understood that the present invention provides a significant advance in the field of integrated FFT circuitry. In particular, the invention allows FFT butterfly modules to be selectively "pruned" in a logical sense, by injecting a zero voltage into selected modules, and significantly reducing overall power dissipation in the circuit. Although the invention has been illustrated in detail with reference to specific examples, it will be understood that the invention may be modified without departing from its spirit and scope. Therefore, the invention should not be limited except as by the appended claims.

The invention claimed is:

1. A fast Fourier transform (FFT) circuit in which butterfly modules may be selectively pruned for use in specific applications, the circuit comprising:

a plurality of computational stages connected in sequence, each computational stage comprising a plurality of butterfly modules connected between multiple input lines and multiple output lines, wherein the computational stages and the butterfly modules are connected to perform an FFT operation on a plurality of input signals applied to a first of the computational stages;

and wherein each of the butterfly modules comprises means for forcing each of its outputs selectively to zero, whereby a zero output from a butterfly module affects at least one module downstream of the zero output and minimizes power dissipation in the at least one affected module.

2. A fast Fourier transform (FFT) circuit as defined in claim 1, wherein the means for forcing outputs selectively to zero comprises a multiplexer for each output of a butterfly module, the multiplexer having:

a first input, to which the output of the butterfly module is connected;

a second input connected to a zero signal;

a control line for selecting between the two inputs; and an output for coupling the selected input to a subsequent computational stage;

and wherein components connected downstream of a zero output signal are effectively pruned from the circuit.

3. A fast Fourier transform (FFT) circuit as defined in claim 2, wherein: selected butterfly modules in one of the computational stages are effectively pruned by forcing selected outputs of prior butterfly stages to zero.

4. A method for effectively pruning a fast Fourier transform (FFT) circuit having a plurality of computational stages, each of which includes a plurality of butterfly modules, the method comprising:

determining which butterfly modules need to be pruned for a particular application of the FFT circuit; and forcing the input signals of the butterfly modules located in the determining step to zero, whereby the selected butterfly modules are effectively pruned from the circuit because of their zero inputs, wherein the step of forcing the input signals to zero is effected by forcing the corresponding output signals in a prior computational stage to zero.

5. A method for effectively pruning a fast Fourier transform (FFT) circuit having a plurality of computational stages, each of which includes a plurality of butterfly modules, the method comprising:

determining which butterfly modules need to be pruned for a particular application of the FFT circuit; and forcing the input signals of the butterfly modules located in the determining step to zero, whereby the selected butterfly modules are effectively pruned from the circuit because of their zero inputs, wherein the step of forcing the input signals to zero comprises using a multiplexer to inject a zero signal into a controlled signal line.

6. A method as defined in claim 5, wherein:

the step of using a multiplexer comprises applying a prune control signal unique to each controlled signal line, to select a zero signal.

* * * * *